G. ROSE.
HEATING APPARATUS.
APPLICATION FILED JULY 17, 1911.
1,016,778.
Patented Feb. 6, 1912.
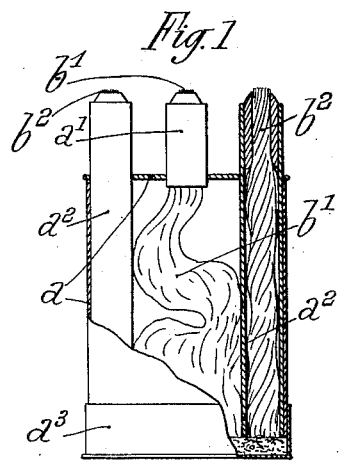
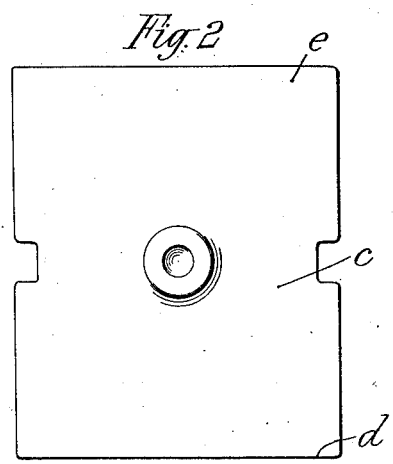
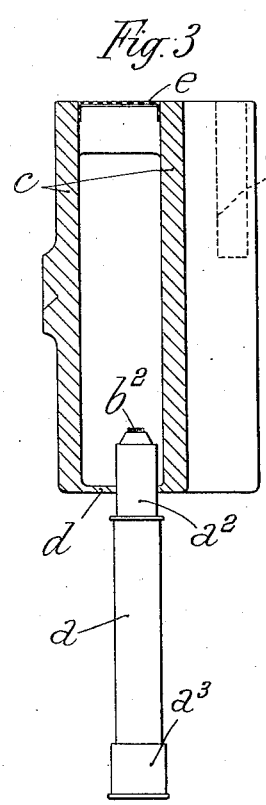
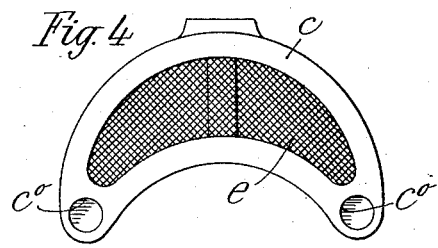
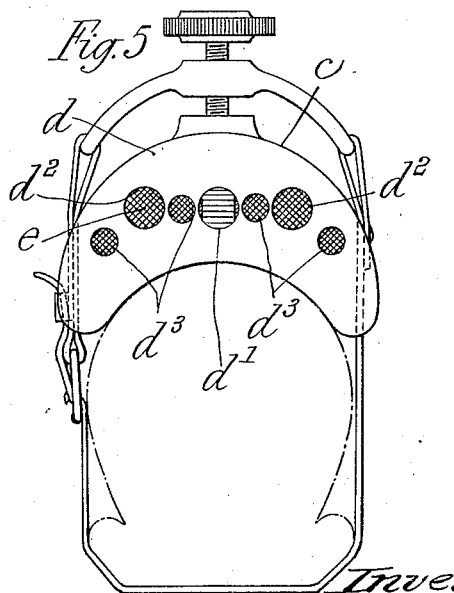
Inventor
Gaston Rose

UNITED STATES PATENT OFFICE.

GASTON ROSE, OF PARIS, FRANCE.

HEATING APPARATUS.

1,016,778.  Specification of Letters Patent.  Patented Feb. 6, 1912.

Application filed July 17, 1911. Serial No. 638,996.

*To all whom it may concern:*

Be it known that I, GASTON ROSE, a citizen of the Republic of France, residing at Paris, France, have invented certain new and useful Improvements in Heating Apparatus, of which the following is a specification.

In the use of heating apparatus for various industrial purposes a number of cases occur in which the apparatus must first produce quickly a comparatively high temperature, and afterward maintain this temperature practically constant, and finally, after a given time the temperature is reduced to the normal. This is the case with heating apparatus used for vulcanizing repaired portions of pneumatic tires or similar articles.

Apparatus has been already suggested for this purpose, but such constructions have been complicated, and the object of this invention is to remedy this drawback.

According to this invention, instead of constructing the heating apparatus in the ordinary manner, namely by means of a single lamp with a mechanism attached for moderating its action at the desired moment, this invention uses simply several lamps, each having the desired duration of combustion, owing to which it is unnecessary to have any additional part or parts, as the lamps in question are sufficient in themselves for attaining the object desired, so that their installation is obviously much simpler and therefore less costly.

Although the invention can be carried out in various ways it is preferably carried out in a manner such as is hereinafter described with reference to the accompanying drawing. In the description and drawing it has been assumed for the sake of simplicity that the apparatus is used for vulcanizing repaired portions of pneumatic tires which appears to be the most important use of the apparatus.

Figure 1 of the drawings shows in front elevation, with parts broken off, heating apparatus according to this invention. Fig. 2 is a front elevation of a vulcanizing apparatus suitable for receiving the heating apparatus. Fig. 3 is an axial section of the vulcanizing apparatus provided with the same heating apparatus. Figs. 4 and 5 finally show the vulcanizing apparatus in top and bottom views, of which Fig. 5 shows the apparatus in position on a pneumatic tire.

In carrying out the invention, in connection with vulcanizing it is no longer necessary to use a single lamp of a heating power which, when it is left to burn normally, can quickly raise the temperature to the desired degree, and when the conditions of working are modified, simply give the heat required for maintaining the temperature previously attained, and which moreover can continue to burn during the time remaining necessary, but, on the contrary, this invention involves the use of a first lamp which can give merely the heat necessary for maintaining the maximum temperature, and which burns during the whole time required for carrying out a complete operation. An additional lamp is also used which can give the extra amount of heat required for attaining the said maximum temperature quickly and which will burn only until the said temperature is attained. If it is considered advisable, one or the other of the lamps in question, or both, are sub-divided into several elementary lamps. And similarly, either the said lamps are left distinct, or combined together, for instance as shown in Fig. 1 of the accompanying drawing.

Referring to the drawing, a casing $a$ is provided in the center of its cover with a branch or burner $a'$ suitable for the passage of a wick $b^1$. Two tubes $a^2$ are arranged in the said casing $a$ with their burning portions projecting outwardly therefrom, these tubes containing wicks $b^2$ and extending to the bottom $a^3$ of said casing. In such a construction, if the capacities of the three lamps have been properly calculated, as soon as said lamps are lighted, all three will burn at first, and then the lamps $a^2$ become extinguished, while the lamp $a'$ continues to burn, and is finally extinguished much later. This enables the object desired to be completely attained, as will be readily understood.

Assuming that the heating apparatus is applied to the vulcanizing apparatus above referred to, it is preferable to adopt for the compound lamp the construction just described, and at the same time for the vulcanizing apparatus, the construction such as is shown in Figs. 2 to 5 of the drawing. Such a vulcanizing apparatus comprises a body $c$ which as regards its surface or surfaces of application and its fixing elements has a shape suitable for the function which it is intended to perform, and constructed so that it constitutes a kind of chimney. A bottom $d$ is provided at one of the ends of the said body or chimney $c$, and is formed with holes $d^1$ and $d^2$ through which the burner portions of the lamps project, and, also, with draft openings $d^3$. The cover $e$ of the said body or chimney is either perforated, or preferably formed of metal netting. The said body $c$ if desired can be further provided with conduits $c^0$ suitable for receiving thermometers, so that if any changes are necessary in its working, or more exactly in the control of the heating system, it is possible to make the necessary measurements very easily.

Obviously the invention is not limited in any way to the constructions more particularly described, but comprises on the contrary any modification thereof.

It must be further understood that the invention not only relates to heating apparatus constructed as described, but also to the elements suitable for forming such apparatus.

What I claim as my invention and desire to secure by Letters Patent is:—

1. A vulcanizing apparatus comprising, in combination, a casing; a plurality of lamps disposed in said casing with their burner portions projecting outwardly therefrom, said lamps being adapted to contain different predetermined quantities of fuel; and a heating chimney adapted to receive said burner portions and to be held in intimate contact with the article to be vulcanized.

2. A vulcanizing apparatus comprising, in combination, a casing; a plurality of lamps disposed in said casing with their burner portions projecting outwardly therefrom, said lamps being adapted to contain different predetermined quantities of fuel; and a chimney adapted to be held in intimate contact with the article to be vulcanized, for heating the same, said chimney having an apertured top and a bottom which is formed with draft openings and with additional openings through which the said burner portions project.

In testimony whereof I have hereunto set my hand in presence of two subscribing witnesses.

GASTON ROSE.

Witnesses:
PAUL BLUM,
H. C. COXE.

---

Copies of this patent may be obtained for five cents each, by addressing the "Commissioner of Patents, Washington, D. C."